United States Patent
Griffin (10) Patent No.: US 6,641,945 B2
(45) Date of Patent: Nov. 4, 2003

(54) FUEL CELL

(76) Inventor: Gus M. Griffin, 422 Country La., Louisville, KY (US) 40207

( * ) Notice: Subject to any disclaimer, the term of this patent is extended or adjusted under 35 U.S.C. 154(b) by 3 days.

(21) Appl. No.: 10/072,300

(22) Filed: Feb. 7, 2002

(65) Prior Publication Data

US 2002/0168558 A1 Nov. 14, 2002

Related U.S. Application Data

(60) Provisional application No. 60/267,110, filed on Feb. 7, 2001.

(51) Int. Cl.$^7$ .............................. H01M 8/18; H01M 6/00
(52) U.S. Cl. ............................. 429/19; 429/30; 429/46; 429/48
(58) Field of Search ............................. 429/19, 46, 30, 429/48, 33, 17

(56) References Cited

U.S. PATENT DOCUMENTS

| | | | |
|---|---|---|---|
| 3,446,671 A | * | 5/1969 | Kring ........................... 429/46 |
| 3,607,066 A | | 9/1971 | Basch et al. |
| 3,884,836 A | | 5/1975 | Kühl et al. |
| 4,102,757 A | | 7/1978 | Chillier-Duchatel et al. |
| 4,363,855 A | * | 12/1982 | Winsel ........................ 429/101 |
| 4,478,916 A | | 10/1984 | Winsel |
| 4,492,741 A | | 1/1985 | Struthers |
| 4,783,381 A | | 11/1988 | Tytgat et al. |
| 6,485,851 B1 | * | 11/2002 | Narayanan et al. ........... 429/17 |

* cited by examiner

Primary Examiner—Patrick Ryan
Assistant Examiner—Raymond Alejandro
(74) Attorney, Agent, or Firm—Carrithers Law Office; David W. Carrithers (57) ABSTRACT

An aqueous solution of hydrogen peroxide is confined in a first chamber and separated from water contained in a second chamber by a membrane that allows hydrogen ions to pass there through. The membrane of the preferred embodiment is a perfluorosulfonic acid cation exchange membrane; however materials such as polymers, glass, ceramic or other material may be utilized herein. Oxygen gas, released from the hydrogen peroxide, is collected and directed by a conduit into the water in the second chamber. An electrical potential exists between one electrode that is immersed in the hydrogen peroxide and a second electrode that is immersed in the water. Excess water is drained (or overflows) as required from the second chamber and hydrogen peroxide can be added to and drained from the first chamber as required. The generation of hydrogen ions, and consequently the electrical energy, can be increased by adding a weak acid such as boric acid to the first chamber and simultaneous removing ions by an anionic exchange resin, or an anion exchange membrane.

11 Claims, 8 Drawing Sheets

FUEL CELL

This application claims priority from U.S. Provisional Application Serial No. 60/267,110 filed on Feb. 7, 2001.

FIELD OF THE INVENTION

This invention relates generally to fuel cells and more particularly to an apparatus having a first chamber containing a hydrogen peroxide solution that is separated from water in a second chamber by a membrane that allows hydrogen ions to pass there through. Hydrogen ions pass through the membrane into the water giving up electrons and an electrical potential exists between a pair of electrodes one of which projects into the hydrogen peroxide and the other into the oxygen. Oxygen molecules released from the hydrogen peroxide collect and are directed into the water in the second chamber. Water is drained from the second chamber and hydrogen peroxide added to and drained from the first chamber as required.

DESCRIPTION OF THE PRIOR ART

Fuel cells conventionally utilize chemicals such as acids, alcohols, or other carbon based fuels often times in gas form in order to generate hydrogen ions needed for producing an electric current. These require expensive disposal of the byproducts generated from the chemicals. Also they tend to form gases which contaminate the catalytic converters and other environmental protection devices.

Hydrogen peroxide is known to be used in fuel cells but none to applicants knowledge specifically use only hydrogen peroxide in one chamber and only water in the other with such chamber being separated by a membrane pervious to hydrogen ions.

A two compartment fuel cell is disclosed in U.S. Pat. No. 4,492,741 granted Jan. 8, 1985 to Ralph C Struthers. The Struthers reference teaches that in the embodiments of his invention the cathode fuel is either a gas or a liquid; however it is dependent upon boron monoxide gas being generated and consumed as the anode fuel. Boron monoxide would be generated by heating borax or some other salt; however, it would seem that a considerable amount of energy would be required possibly resulting in a net loss of energy. As set forth in FIGS. 9 and 10, energy gained in the fuel cell is used to regenerate the boron monoxide with results which appear to be contradictory to the teachings in FIG. 10.

U.S. Pat. No. 4,783,381 granted Nov. 8, 1988 to Daniel Tytgat et al discloses a two compartment fuel cell. The patentee teaches the advantages of using a hydrogen peroxide solution as the fuel as opposed to fuels used in other fuel cells; however, the hydrogen peroxide used as the fuel must be introduced continuously and simultaneously into the anode compartment and cathode compartment. Moreover, the invention appears to require that the pH in both chambers must be controlled.

SUMMARY OF THE INVENTION

In the present invention an aqueous solution of hydrogen peroxide is retained in a first chamber having at least a portion of a wall thereof made of a membrane that separates the hydrogen peroxide from water in a second chamber. The membrane is of a material that allows ions to pass there through whereby hydrogen ions from the hydrogen peroxide pass into the water. The membrane maybe a plastics material, glass, ceramic or other material known for the purpose. Oxygen released from the hydrogen peroxide is directed into the water in the second chamber.

Although hydrogen peroxide contains about half as much hydrogen as methanol, which is reformed to supply many cells, storage, conversion, and elimination of by-products is simpler and less expensive than with the carbon-based fuels. A hydrogen peroxide solution having a concentration of up to 3 percent is fed directly to the first chamber without the catalytic reforming required by alcohols or other carbon based fuel. Also hydrogen peroxide is stored in ordinary vessels at ambient temperature and pressure. No carbon fuel is used and no greenhouse carbon compounds are generated by the apparatus of the present invention. The only adjustment necessary to maintain a study state reaction is to add more hydrogen peroxide solution.

In one embodiment the apparatus of the present invention includes first and second containers providing respectively a first chamber having an effective amount of up to a 3 percent hydrogen peroxide solution deposed therein and a second chamber having water therein. Unlike conventional fuel cells, the instant invention is effective utilizing only the hydrogen peroxide and water. A first electrode extends into the hydrogen peroxide in the first container and a second electrode extends into the water in the second container. Means for removing water from the second container is provided, such as for example a drain plug or overflow. oxygen released from the hydrogen peroxide is directed via a conduit into the water in the second chamber. Means is provided for adding hydrogen peroxide to and removing it from the first chamber as required.

In another preferred embodiment the apparatus is a single container divided by a membrane into two compartments.

More particularly one preferred embodiment of the fuel cell of the present invention comprises a container having a first chamber having a selected quantity of a solution of hydrogen peroxide therein and a second chamber having a selected quantity of water therein. A membrane permeable to hydrogen ions separates the water in the second chamber from the solution of hydrogen peroxide in the first chamber. A first electrode extends into the hydrogen peroxide in the first chamber, and a second electrode extending into the water in the second chamber. Means for collecting oxygen released in the first chamber and returning at least a portion thereof to the water in the second chamber is provided together with means for removing water from the second chamber.

Furthermore, a preferred embodiment provides for a hydrogen oxygen fuel cell including a first container made of a material selectively permeable to hydrogen ions whereby the container providing a first chamber having an effective amount of a hydrogen peroxide solution deposed therein. A first electrode extends into the hydrogen peroxide solution contained in the first container. A second container surrounds the first container providing a second chamber containing a selected quantity of water therein wherein the first container separates the hydrogen peroxide therein from the water in the second container. A second electrode extends into said water in the second container. Means for removing water from the second container are included together with means for collecting oxygen released from the hydrogen peroxide and directing the same into the water in the second container. The electrodes provide an electrical potential connectable to a load external to the containers. An anion resin may be used in electrical communication with the anode to control the reaction.

In a third preferred embodiment, a container comprises a first chamber having a selected quantity of a solution of hydrogen peroxide therein and a second chamber having a selected quantity of water therein. A membrane permeable to hydrogen ions separates the water in the second chamber from the solution of hydrogen peroxide in the first chamber. A first electrode extends into the hydrogen peroxide in the first chamber, and a second electrode extending into the water in the second chamber. Means for collecting oxygen released in the first chamber and returning at least a portion thereof to the water in the second chamber is provided together with means for removing water from the second chamber. A weak acid such as boric acid is added to the anode chamber to increase the supply of H+ ions. The boric oxide ions can be removed by adding an anion membrane or by using a third chamber in electrical communication therewith containing an anionic exchange resin, which may be regenerated periodically with a salt such as sodium chloride and reused.

It is an object of the present invention to provide a fuel cell in which both the hydrogen and the oxygen are produced by decomposition of hydrogen peroxide.

It is another object of the present invention to provide a fuel cell which consumes hydrogen peroxide only, with no other substance required.

It is yet another object of the present invention to provide a fuel cell in which hydrogen and oxygen produced on one side of a membrane are recombined on the other side of the membrane.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 4 is a side elevational view of an apparatus of the present invention in which a single container is separated into two chambers by a membrane made of a material that allows hydrogen ions to pass there through;

DESCRIPTION OF THE PREFERRED EMBODIMENT

Referring to the drawings in FIGS. 1–6, the apparatus of the present invention comprises a first chamber 10 containing a hydrogen peroxide solution 20 separated from water 30 in a second chamber 40 by a membrane 50. The membrane can be comprised of any suitable known material that allows hydrogen ions to pass there through. The preferred membrane utilized in the preferred embodiment is a perfluorosulfonic acid membrane such as can be purchased from the DuPont Company under the tradenames of NAFION. NAFION 117 is an unreinforced film of 1100 equivalent weight pefluorinated copolymer used from water and hydrogen chloride electrolysis and fuel cells. Moreover, NAFION 324 has 1500 and 1100 equivalent weight copolymer layers, NAFION 423 has a 1200 equivalent weight copolymer, and NAFION 424 is may be used in selected applications. There is an electrode 60 of stainless steel immersed in the hydrogen peroxide and a gas cathode electrode 70 of cobalt on nickel immersed in the water. These are preferably high surface area electrodes.

The aqueous solution of up to 3 percent hydrogen peroxide, ((3%) maximum), releases oxygen on standing, producing hydrogen ($H^+$) ions and water. The pH of such a solution decreases as the $H^+$ concentration increases.

The reactions are set forth as follows;

$$2H_2O_2 \rightarrow 4H^+ + 2O^{2-} + 4e^-$$

$$2H_2O_2 \rightarrow 2H_2O + O_2$$

The $H^+$ ions pass through the membrane 50 which is made of material known for the purpose. The larger $O_2$ molecules produce gas that collects in the upper part of the first chamber and is returned to the water via a conduit 80 where the oxygen molecules combine with the hydrogen ions present in the water.

$$4H^+ + O_2 + 4e^- \rightarrow 2H_2O + 1.3V$$

Figure 1:
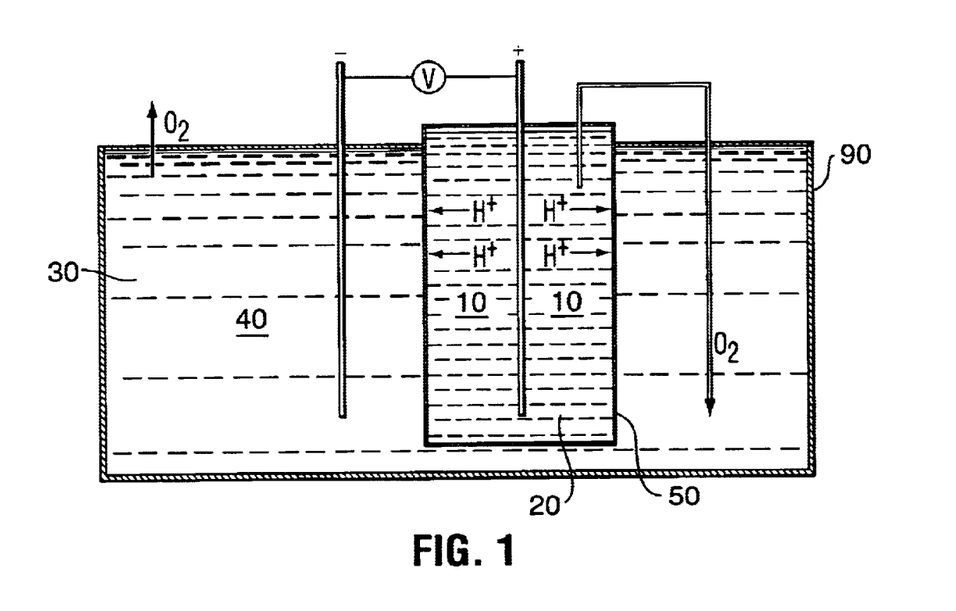
FIG. 1 is a schematic illustrating a preferred embodiment present invention.

An electrical potential exists between electrodes 60 and 70 located on respective opposite sides of the membrane. The electrodes are connectable vial suitable lead means to a load external to the containers. The overall reaction for the cell is shown in FIG. 1.

Figure 2:
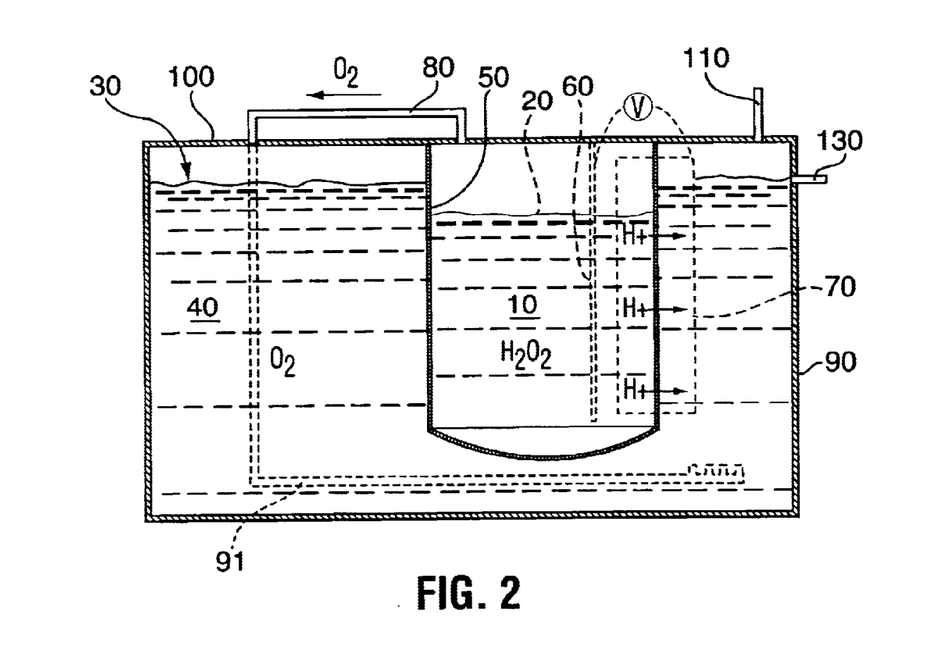
FIG. 2 is a side elevational view of an apparatus provided in accordance with the present invention in which the electrodes and hydrogen peroxide containing container are shown in broken lines.
Figure 3:
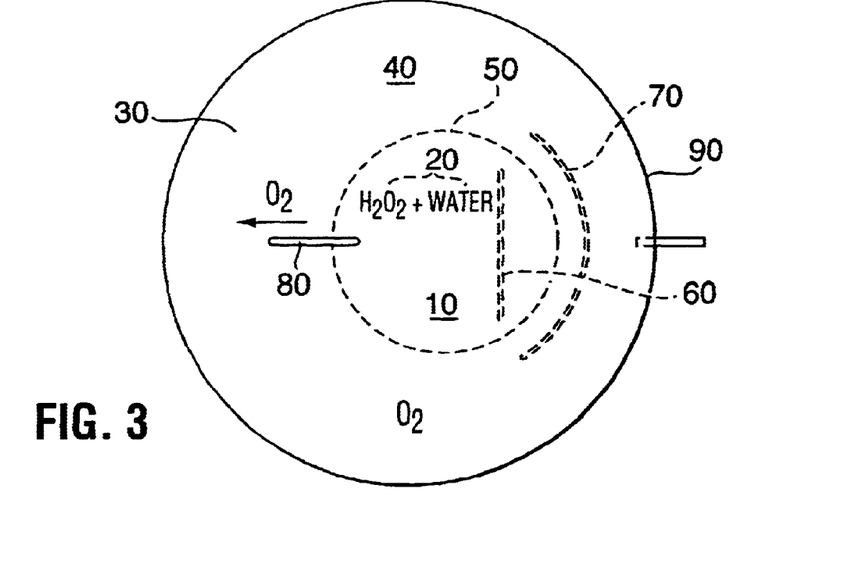
FIG. 3 is a top plan view of the apparatus shown in FIG. 2.

In the apparatus shown in FIGS. 2 and 3 the membrane 50 is a cylindrical container providing the first chamber 10 and is located within a second container 90 that provides the second chamber 40. A cover 100 extends over the containers closing the cylindrical container at the top thereof. An oxygen return line 80 communicates at one end thereof with the portion of the chamber 10 above the hydrogen peroxide and terminates at the other end in a manifold 91 immersed in the water in the chamber 40. The cylindrical container is fabricated from a plastics material, glass, ceramic or other material capable of selectively passing hydrogen ions there through from the aqueous solution of hydrogen peroxide in the chamber 10 into the water in the chamber 40. The hydrogen peroxide decomposes to oxygen gas and hydrogen ions. The hydrogen ions pass through the membrane while the oxygen is returned to the surrounding water via the conduit 80.

In summary, the reactions are:

$$2H_2O_2 \rightarrow 4H^+ + 2O^{2-} + 4e^-$$

$$4H^+ + O_2 + 4e^- \rightarrow 2H_2O \quad 1.3V$$

$$2H_2O_2 \rightarrow 2H_2O + O_2 + 1.3V$$

Excess oxygen that is generated is vented via a suitable vent means 110.

Figure 4:
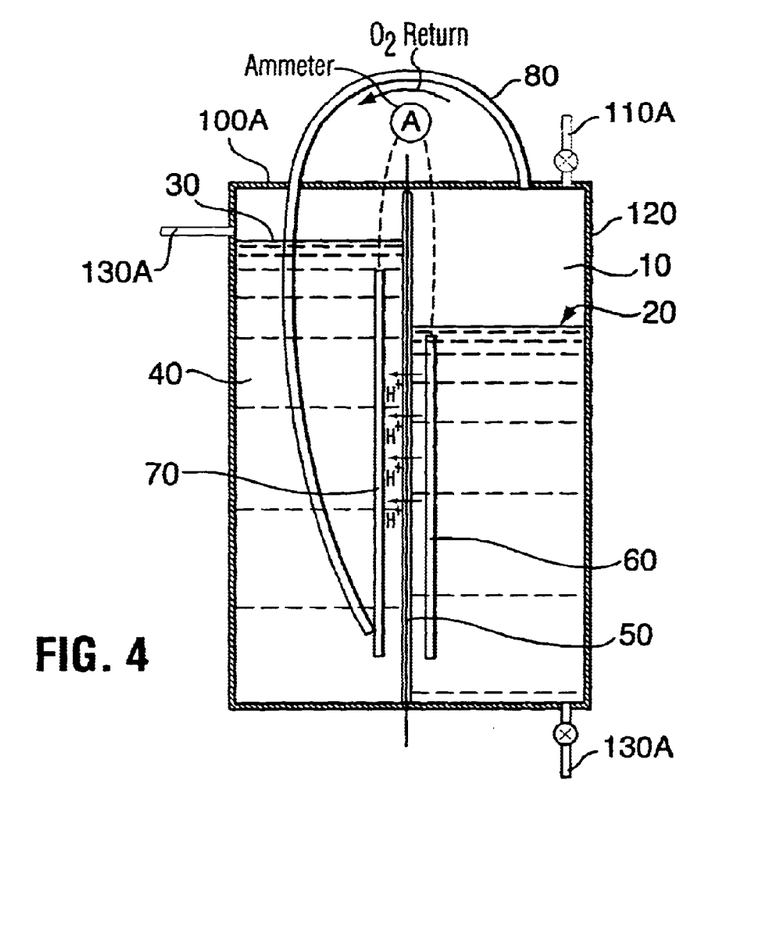

In the embodiment of FIG. 4, a container 120 is divided by the membrane 50 into chambers 10 and 40 that contain respectively the hydrogen peroxide 20 and the water 30. A cover 100A closes the chambers. The chamber 10 has means 110 controllably feeding hydrogen peroxide thereto and means 130 for controllably bleeding water therefrom. Oxygen that accumulates is directed via conduit 80 into the water. The electrode 60(anode) and the electrode 70(cathode) are each a flat plate and are immersed respectively in the hydrogen peroxide and the water. Leads from the electrodes extend external to the container for connecting to a load. Water overflows through a suitably located drain 130A which also acts as a vent.

Figure 7:
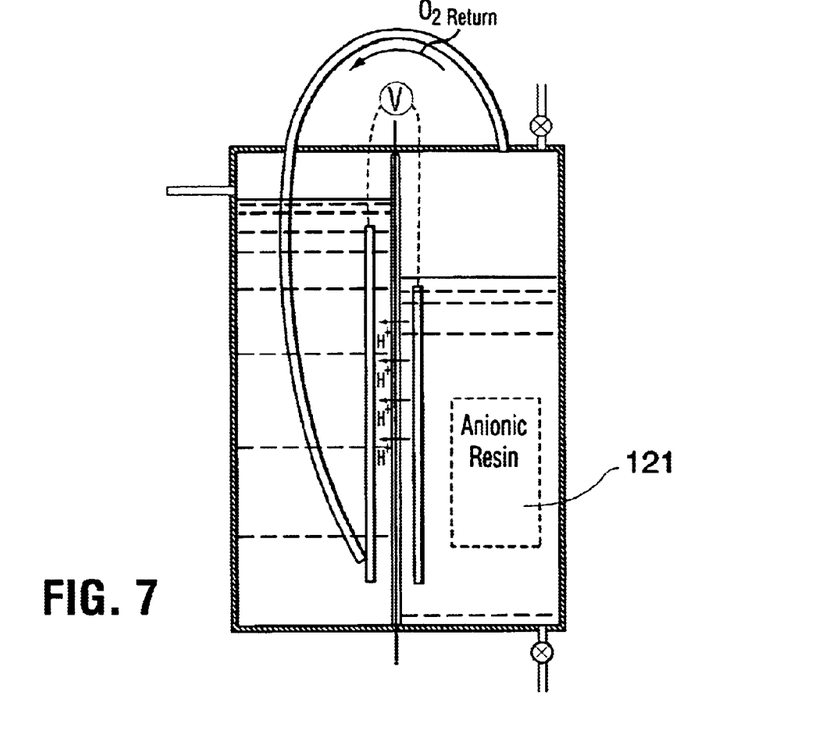
FIG. 7 is a side elevational view of an apparatus of FIG. 4 including anion exchange resin.
Figure 8:
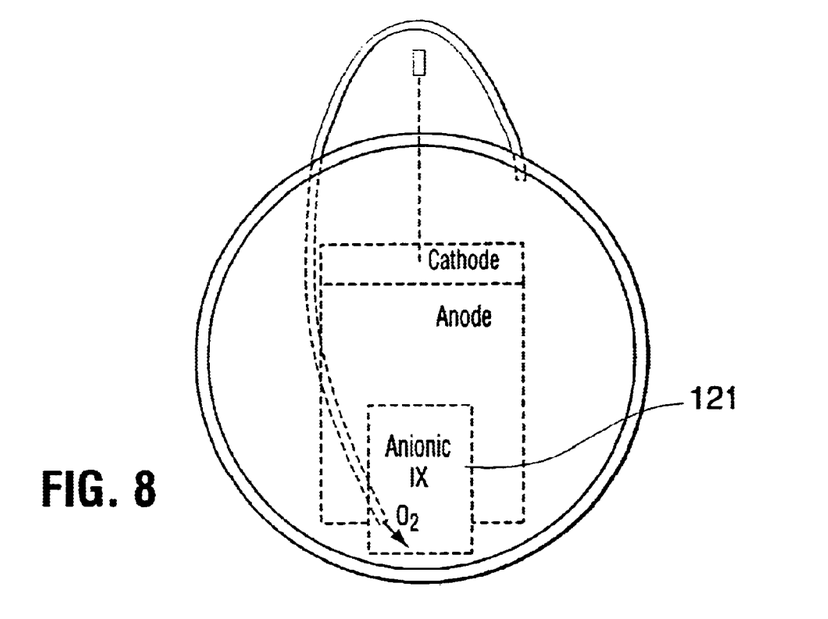
FIG. 8 is a top view of the apparatus shown in FIG. 7.

As shown in FIGS. 7 and 8 an anion exchange resin is contained in the chamber with the anode 121, such as is sold by Rohn & Haas Corporation as IRA4020H. The anion exchange resin provides a means to control the concentration of anions and the rate of reaction.

Figure 5:
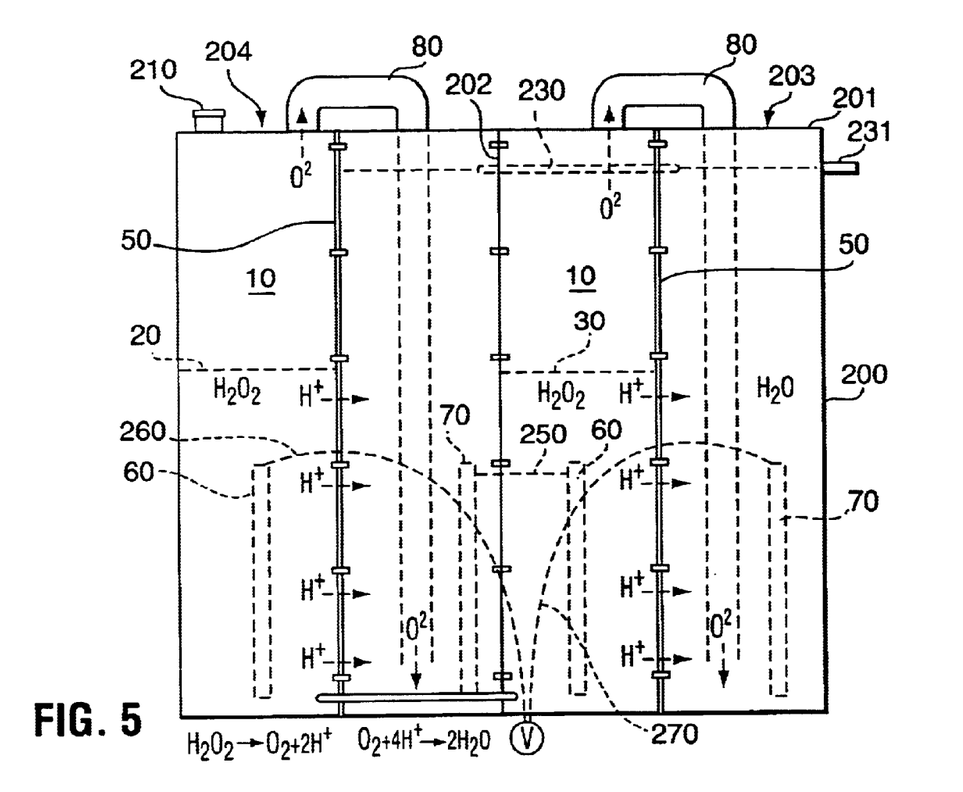
FIG. 5 is an elevational view of a fuel cell unit provided in accordance with the present invention; and showing a means of multiplying the voltage by connection cells in series.
Figure 6:
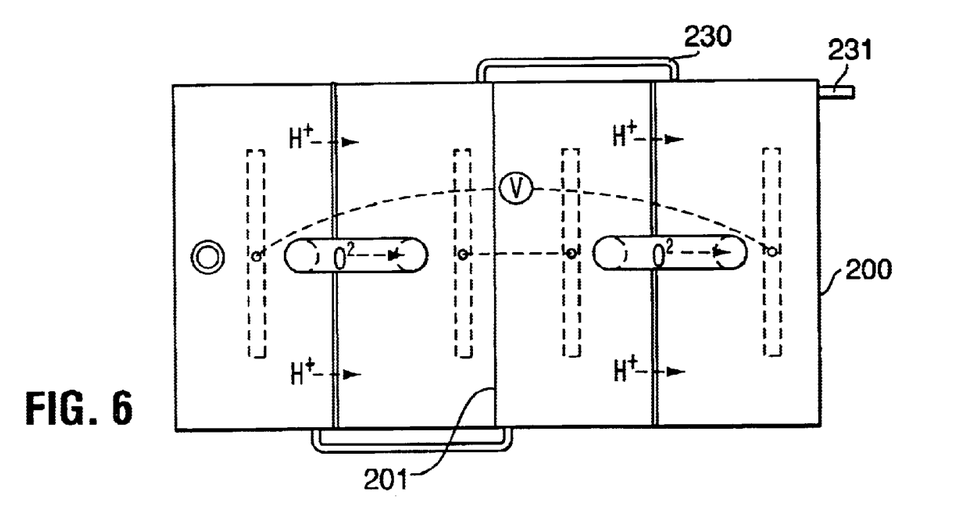
FIG. 6 is a top plan view of the unit shown in FIG. 5.

The fuel cell unit shown in FIGS. 5 and 6 comprises a container 200 having a top cover 201 and a partition wall 202 providing a pair of fuel cells designated respectively 203 and 204. Each fuel cell 203, 204 has as previously described a first chamber 10 containing a solution of only hydrogen peroxide and a second chamber containing water and which are separated by a membrane 50. The chambers 10 of the respective fuel cells 203 and 204 are interconnected by a conduit 205 to equalize the hydrogen peroxide in such chambers. Hydrogen peroxide is added via a fill means 210. The water level is equalized by a conduit 230 interconnecting the respective pair of chambers 40. The conduit 230 maybe vented to atmosphere and provide an overflow for water that accumulates or a separate overflow 231 maybe provided. The adjacent electrodes 60 and 70 are interconnected by a lead 250 and the other pair of electrodes 60, 70 are connectable to a load external to the unit by respective leads 260 and 270.

The electrode 60 instead of stainless steel may be made of other conductors such as platinum, silver, or nickel which act as catalysts to speed the reaction in the cell which does not operate at high temperatures. The conversion of hydrogen peroxide to water and oxygen with the release of energy should not contaminate the electrodes and permit long life thereof.

Thus, the fuel cell utilizes hydrogen peroxide as the source of both hydrogen and oxygen. As best shown in FIGS. 5 and 6, the two cells are shown to illustrate 'stacking' to obtain higher voltage, and it is contemplated that several cells can be stacked to provide the desired output. Each cell consists of two chambers separated by a membrane which passes hydrogen ions only. The left chamber is shown to billed to the full line with hydrogen peroxide, which overflows to the same chamber in the next cell as shown. The right cells are filled to overflow with water, whereby the electrodes are submerged in the liquid in all four chambers. The hydrogen peroxide decomposes to oxygen and hydrogen ions, which pass through the membranes and give up electrons. Oxygen flows out of the top of the peroxide chamber into the water, where it combines with the hydrogen ions to form more water using these electrons. The electrode in the first peroxide chamber is connected to the electrode in the last water chamber to double the voltage. The electrode first peroxide chamber is connected to the electrode in the last water chamber to double the voltage. The electrode in the first water chamber is connected to the electrode in the second peroxide chamber. In this way the two cells are in series ant eh voltages add. Moreover, the reactions at the electrode can be accelerated by catalysts.

Figure 9:
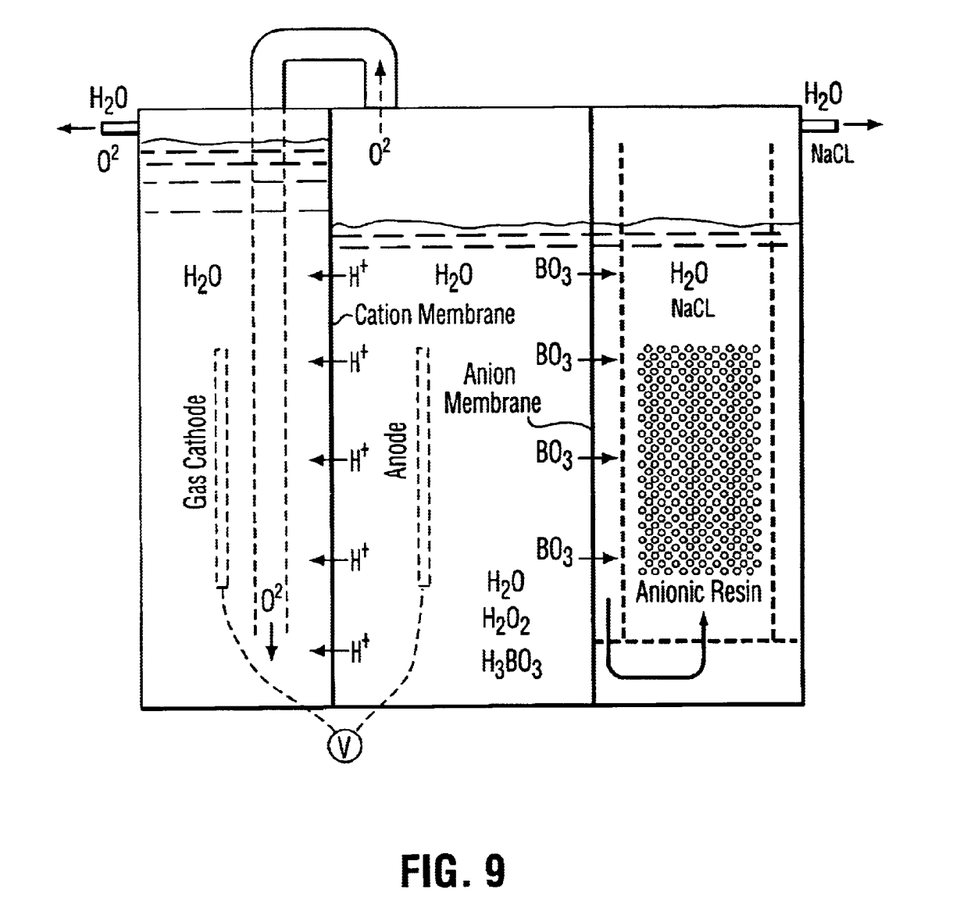
FIG. 9 is a side elevational view of an apparatus of the present invention in which a single container is separated into three chambers by a first membrane made of a material that allows hydrogen ions to pass there through, and a second membrane that allows hydrogen ions to pass through to the anode from an anion exchange resin in fluid and electrical communication with the anode and a weak acid.
Figure 10:
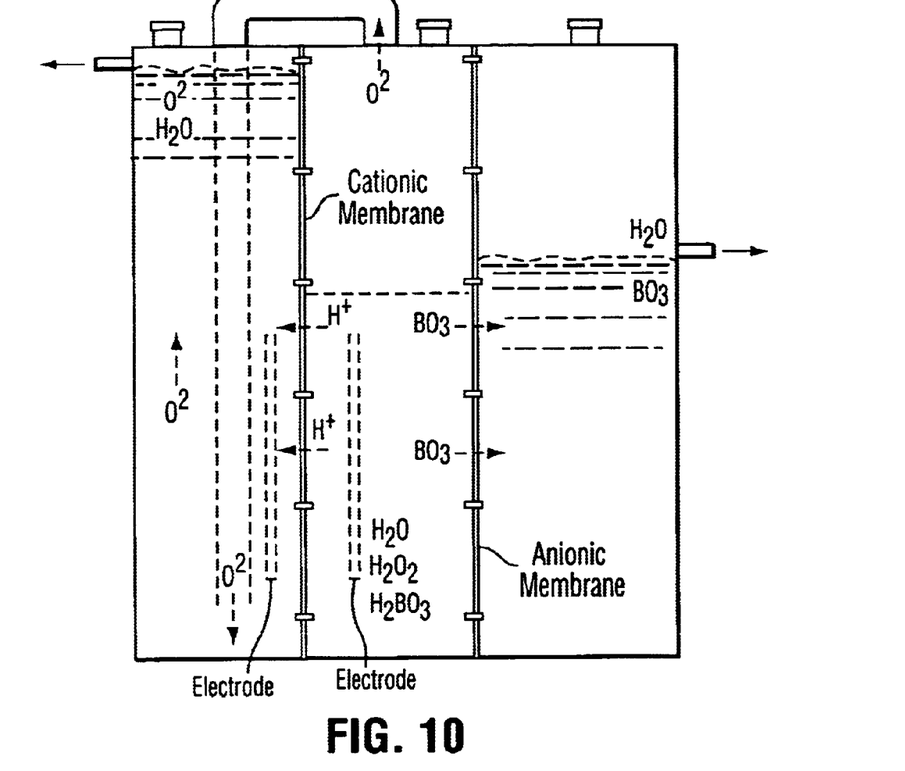
FIG. 10 is an elevational view of a fuel cell unit provided in accordance with the present invention; and showing a cation membrane to separate the oxygen and hydrogen and use of an anion membrane utilized together with a weak solution of boric acid to remove the anions.
Figure 11:
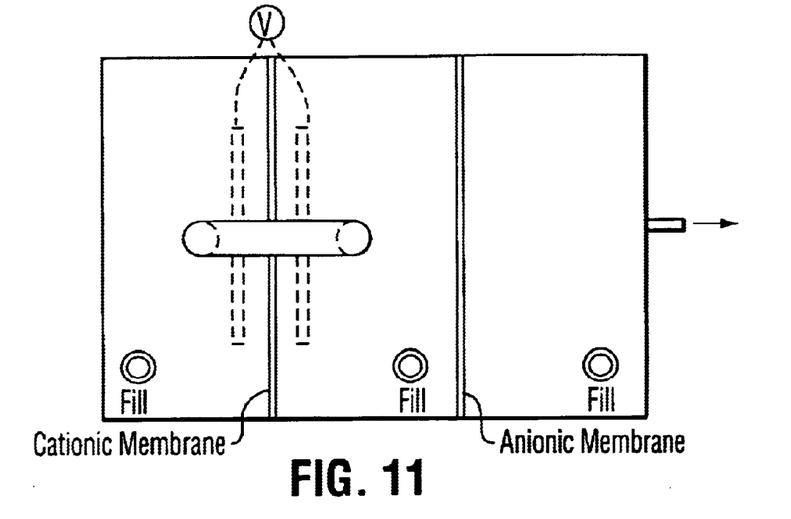
FIG. 11 is a top plan view of the unit shown in FIG. 10.
Figure 12:
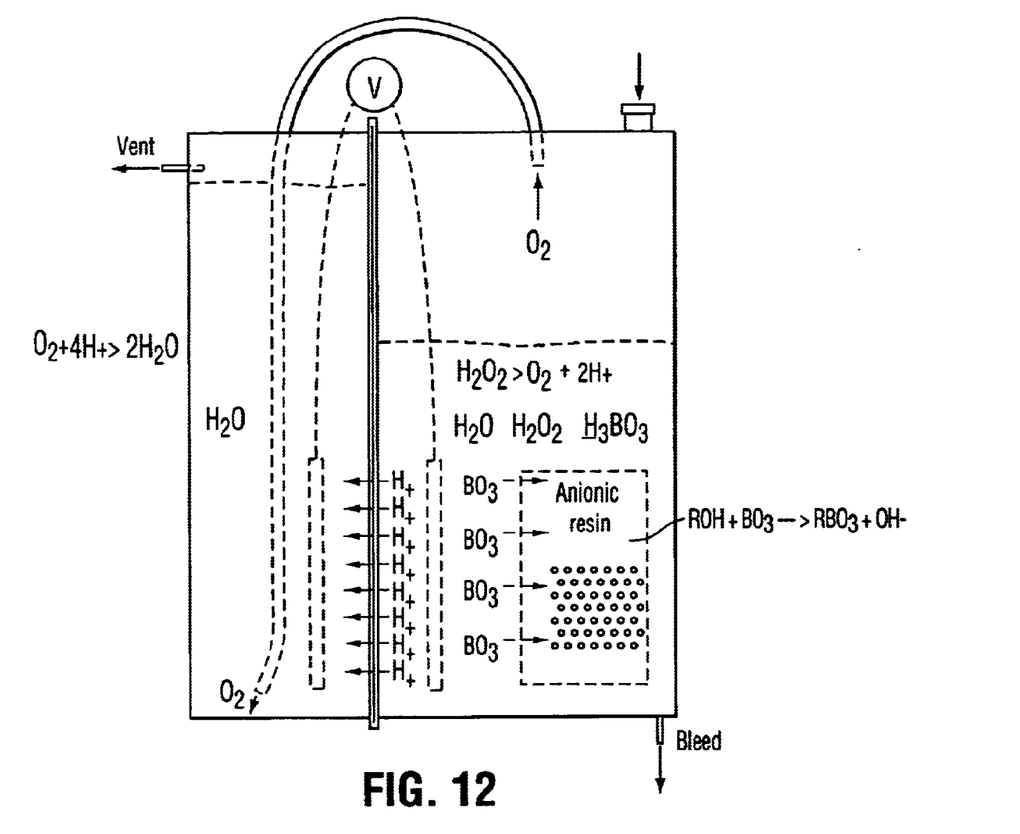
FIG. 12 is an elevational view of a fuel cell unit provided in accordance with the present invention; and showing a cation membrane to separate the oxygen and hydrogen and use of an anion resin utilized together with a weak solution of boric acid to remove the anions and generate hydrogen ions from the boric acid.
Figure 13:
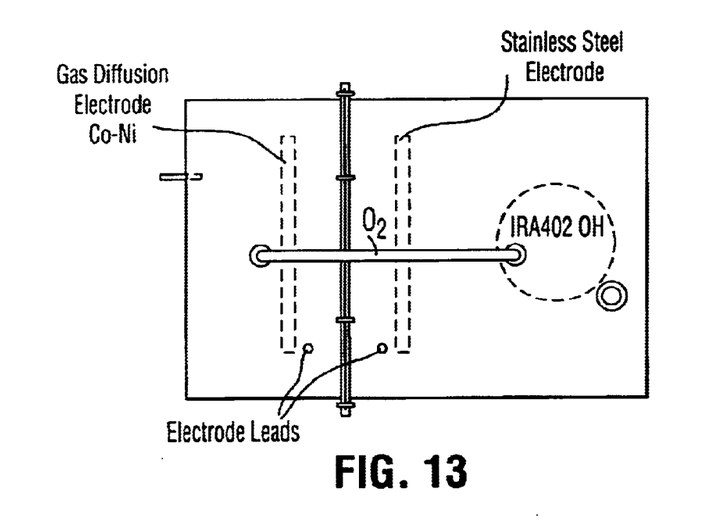
FIG. 13 is a top plan view of the unit shown in FIG. 10.
Figure 14:
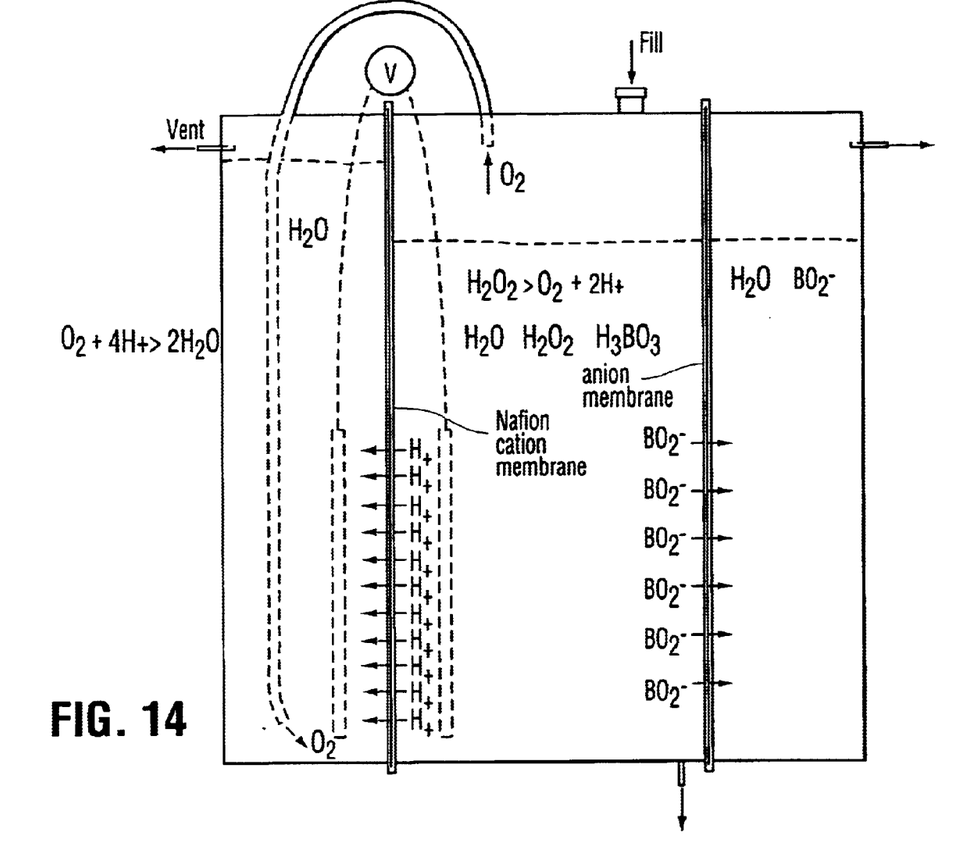
FIG. 14 is an elevational view of a fuel cell unit provided in accordance with the present invention and showing an anion membrane sandwiched between plates to remove anions generated by a weak solution of boric acid.
Figure 15:
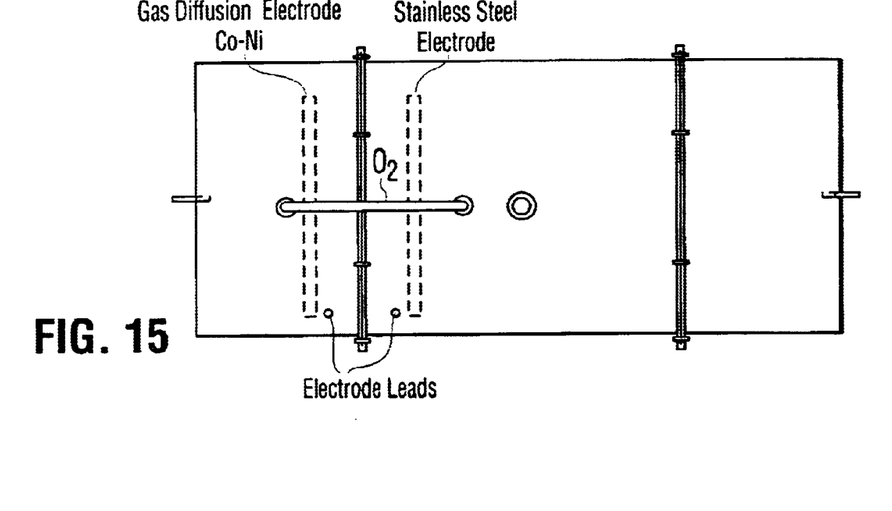
FIG. 15 is a top plan view of the unit shown in FIG. 14.

FIG. 9 shows an apparatus of the present invention in which a single container is separated into three chambers by a first membrane made of a material that allows hydrogen ions to pass there through, and a second membrane that allows hydrogen ions to pass through to the anode from an anion exchange resin in fluid and electrical communication with the anode and a weak acid. A container includes a first chamber having a selected quantity of a solution of hydrogen peroxide therein and a second chamber having a selected quantity of water therein. A membrane permeable to hydrogen ions separates the water in the second chamber from the solution of hydrogen peroxide in the first chamber. A first electrode extends into the hydrogen peroxide in the first chamber, and a second electrode extending into the water in the second chamber. Means for collecting oxygen released in the first chamber and returning at least a portion thereof to the water in the second chamber is provided together with means for removing water from the second chamber. The voltage generated in a fuel cell when hydrogen peroxide in the only source of hydrogen is very low because decomposition produces mostly oxygen and water rather than H+ ions which are needed. Adding a solution of weak acid such as a boric acid solution to the anode chamber increases the supply of H+ ions. A weak acid such as boric acid is added to the anode chamber to increase the supply of H+ ions. The boric oxide anions can be removed by adding an anion membrane or by using a third chamber in electrical communication therewith containing an anionic exchange resin, which may be regenerated periodically with a salt such as sodium chloride and reused. The use of a anion membrane utilizes the same chemistry as the utilization of the ion exchange resin in that the membrane is essentially a mesh containing an anion exchange resin.

Thus, as shown in FIGS. 10–13, the flow of H+ ions through the cation membrane, and consequently the electrical energy, may be significantly increased by addition of a weak acid such as a solution of boric acid to the anode chamber. It will be apparent that the concentration of anions will increase, and must be controlled which is easily accomplished by the use of the anion exchange resin or by adding the anion membrane which passes the anions into a third chamber. If the anion resin is used, the resin can be regenerated as necessary with caustic soda or other hydroxide.

It is also anticipated that insoluble calcium of magnesium borates could be utilized in combination with a solution of weak borate acid to remove anions generated by the fuel cell.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

I claim:

1. A fuel cell comprising:

(a) container means providing a first chamber having a selected quantity of a solution of hydrogen peroxide therein and a second chamber having a selected quantity of water therein;

(b) a membrane permeable to hydrogen ions separating the water in said second chamber from the solution of hydrogen peroxide in said first chamber;

(c) a first electrode extending into the hydrogen peroxide in said first chamber;

(d) a second electrode extending into the water in said second chamber;

(e) means for collecting oxygen released in said first chamber and returning at least a portion thereof to the water in said second chamber; and (f) means for removing water from said second chamber.

2. The apparatus of claim 1 wherein the hydrogen peroxide solution is a 3% maximum solution.

3. The apparatus of claim 2 wherein the electrode in the first chamber comprises a stainless steel plate immersed in said hydrogen peroxide.

4. The apparatus of claim 3 wherein the electrode in second chamber comprises nickel and cobalt and is immersed the water therein.

5. The apparatus of claim 4, wherein said first chamber comprises a container made of material pervious to hydrogen ions and wherein said first container is located in a second container that provides said second chamber.

6. A hydrogen oxygen fuel cell, comprising:

(a) a first container made of a material selectively permeable to hydrogen ions, said container providing a first chamber having an effective amount of a hydrogen peroxide solution deposed therein;

(b) a first electrode extending into said hydrogen peroxide solution contained in said first container;

(c) a second container surrounding said first container and providing a second chamber, said second chamber containing a selected quantity of water therein, said first container separating the hydrogen peroxide therein from said water in said second container;

(d) a second electrode extending into said water in said second container;

(e) means for removing water from said second container; and (f) means for collecting oxygen released from said hydrogen peroxide and directing the same into the water in said second container, said electrodes providing an electrical potential connectable to a load external to said containers.

7. The hydrogen oxygen fuel cell of claim 6, wherein the hydrogen and the oxygen are produced by the decomposition of hydrogen peroxide.

8. The hydrogen oxygen fuel cell of claim 6, including means for increasing flow of H+ ions through the membrane, and consequently the electrical energy, by adding a weak acid to the first chamber.

9. The hydrogen oxygen fuel cell of claim 8, wherein said weak acid is boric acid.

10. The hydrogen oxygen fuel cell of claim 6, wherein anions are removed by an anion resin deposed in said solution in electrical communication therewith.

11. The hydrogen oxygen fuel cell of claim 6, wherein anions are removed by an anion membrane deposed in said solution in electrical communication therewith.

* * * * *